United States Patent
Kurakami

(10) Patent No.: US 12,124,590 B2
(45) Date of Patent: Oct. 22, 2024

(54) TESTING DEVICE, TESTING METHOD, AND TESTING PROGRAM

(71) Applicant: NIPPON TELEGRAPH AND TELEPHONE CORPORATION, Tokyo (JP)

(72) Inventor: Hiroshi Kurakami, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/773,039

(22) PCT Filed: Nov. 11, 2019

(86) PCT No.: PCT/JP2019/044159
§ 371 (c)(1),
(2) Date: Apr. 29, 2022

(87) PCT Pub. No.: WO2021/095100
PCT Pub. Date: May 20, 2021

(65) Prior Publication Data
US 2024/0169067 A1    May 23, 2024

(51) Int. Cl.
*G06F 21/57* (2013.01)

(52) U.S. Cl.
CPC ................ *G06F 21/577* (2013.01)

(58) Field of Classification Search
CPC ..................................... G06F 21/577
See application file for complete search history.

(56) References Cited

U.S. PATENT DOCUMENTS

| | | | |
|---|---|---|---|
| 6,990,616 B1* | 1/2006 | Botton-Dascal | H04L 43/50 709/238 |
| 10,362,940 B2* | 7/2019 | Tran | G16H 50/20 |
| 11,595,289 B2* | 2/2023 | Lee | H04L 43/50 |
| 2010/0188995 A1* | 7/2010 | Raleigh | H04L 63/08 370/252 |
| 2013/0039189 A1 | 2/2013 | Sugiyama et al. | |
| 2013/0246359 A1 | 9/2013 | Sugiyama et al. | |

(Continued)

FOREIGN PATENT DOCUMENTS

JP   2003-8641 A    1/2003
JP   2006-352290 A   12/2006

(Continued)

OTHER PUBLICATIONS

Ixia, "Denial of Service (DOS) Testing" IxChariot, Test Plan, Available Online At: https://support.ixiacom.com/sites/default/files/resources/test-plan/dos_0.pdf, 2005, pp. 1-9.

*Primary Examiner* — Raqiul A Choudhury
(74) *Attorney, Agent, or Firm* — XSENSUS LLP

(57) ABSTRACT

A testing device (10) acquires session information to configure a session with a server (23), which is a to-be-tested device, protected by a security device (22) performing authentication of a packet. Then, the testing device (10) generates a test packet with the session information acquired, generates a test session according to a predetermined scenario when transmitting the test packet to the server (23), and transmits to the server (23) a test packet that increases processing load.

19 Claims, 5 Drawing Sheets

(56) References Cited

U.S. PATENT DOCUMENTS

| | | | | |
|---|---|---|---|---|
| 2013/0305096 A1* | 11/2013 | Kim | ................... | G06F 11/3688 |
| | | | | 714/38.1 |
| 2013/0343390 A1* | 12/2013 | Moriarty | ............. | H04L 43/0852 |
| | | | | 370/392 |
| 2014/0258524 A1* | 9/2014 | Thyni | ................. | H04L 43/0852 |
| | | | | 709/224 |
| 2015/0003457 A1 | 1/2015 | Sugiyama et al. | | |

FOREIGN PATENT DOCUMENTS

| | | |
|---|---|---|
| JP | 2013-41341 A | 2/2013 |
| JP | 2013-196377 A | 9/2013 |
| JP | 2017-97758 A | 6/2017 |
| WO | 2013/057773 A1 | 4/2013 |

* cited by examiner

TESTING DEVICE, TESTING METHOD, AND TESTING PROGRAM

CROSS-REFERENCE TO RELATED APPLICATION

The present application is based on PCT filing PCT/JP2019/044159, filed Nov. 11, 2019, the entire contents of which are incorporated herein by reference.

TECHNICAL FIELD

The present invention relates to a testing device, a testing method, and a testing program.

BACKGROUND ART

Schemes have conventionally been proposed that transmit a packet for applying load to an instrument to perform packet load test (for example, see NPL 1). Schemes have also been proposed that perform packet load test on a subject device protected by a security system.

CITATION LIST

Non Patent Literature

[NPL 1] IXIA, "Denial of Service (DOS) Testing"

SUMMARY OF THE INVENTION

Technical Problem

Unfortunately, the conventional schemes have a problem that they may not appropriately test a to-be-tested device that needs login authentication. For example, the conventional schemes have a problem that for a to-be-tested device that needs login authentication, when testing a Web page that may be accessed only after login, the login processing is necessary for each test session and the load of the to-be-tested Web page as well as the load of the login page are added.

The conventional schemes also have a problem that monitoring of the login page may protect the entire Web site so that even if there is a problem with a Web page that may be accessed only after login, it is difficult to discover it. There is also a problem that if a Web site that displays a login page and a Web site that displays a Web page displayed after login are configured on different sites, it is hard to test only the Web site that displays the Web page displayed after login.

Means for Solving the Problem

In order to solve the above problems and achieve the purpose, a testing device according to the present invention includes: a session management unit for acquiring session information to configure a session with a to-be-tested device protected by a security device performing authentication of a packet; a test scenario unit for generating a test packet with the session information acquired by the session management unit and generating a test session according to a predetermined scenario when transmitting the test packet to the to-be-tested device; and a transmission unit for transmitting to the to-be-tested device a test packet that increases processing load.

Effects of the Invention

The present invention may provide an appropriate test to a to-be-tested device that needs login authentication.

DESCRIPTION OF EMBODIMENTS

An embodiment of a testing device, testing method and testing program according to this application will be described in more detail below in conjunction with drawings. Note that this embodiment is not intended to limit the present invention.

Configuration of First Embodiment

Figure 1:
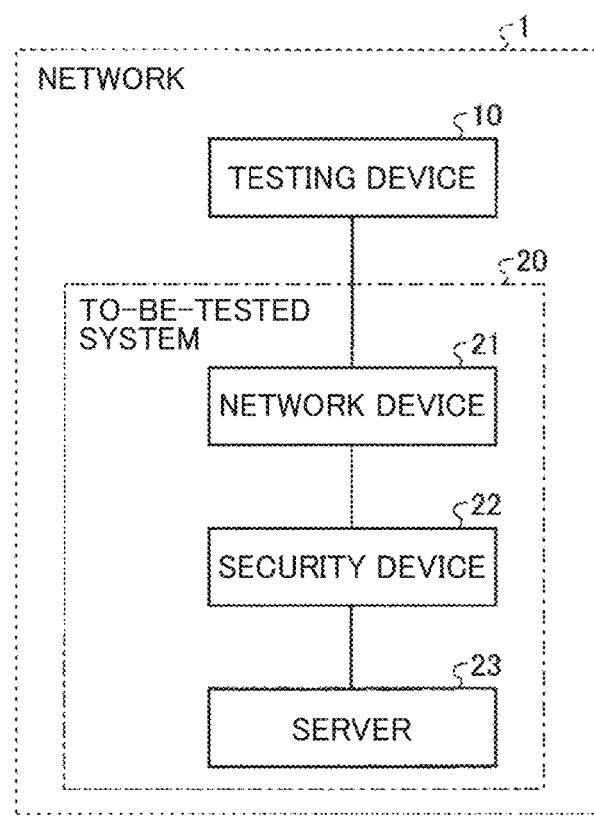
FIG. 1 illustrates an example configuration of a network having a testing device according to a first embodiment.

First, a configuration of a network having a testing device according to a first embodiment will be described with reference to FIG. 1. FIG. 1 illustrates an example configuration of a network having a testing device according to the first embodiment.

As shown in FIG. 1, a network 1 includes a testing device 10 and a to-be-tested system 20. In addition, the to-be-tested system 20 includes a network device 21, a security device 22, and a server 23. The systems and devices in the network 1 are connected by, for example, any type of communication network including wired or wireless local area network (LAN) and virtual private network (VPN).

The testing device 10 includes a test packet transmitting/receiving unit 121, a monitoring unit 122, a management unit 123, and a storage unit 13. The test packet transmitting/receiving unit 121 transmits a test packet for security resistance test to the devices included in the to-be-tested system 20. The test packet transmitting/receiving unit 121 also receives a packet transmitted from the to-be-tested system 20 in response to the test packet. The monitoring unit 122 monitors the load situation of the devices in the to-be-tested system 20. In addition, the management unit 123 performs setting and acquires and analyzes information related to the test packet transmitting/receiving unit 121 and the monitoring unit 122.

For example, in the example in FIG. 1, the testing device 10 performs the test packet transmitting/receiving unit 121 and monitoring unit 122 according to the setting by the management unit 123. Note that for example, a plurality of testing devices 10 may be distributed so that the test packet transmitting/receiving unit 121, the monitoring unit 122, and the management unit 123 are performed distributedly by the testing devices.

Figure 2:
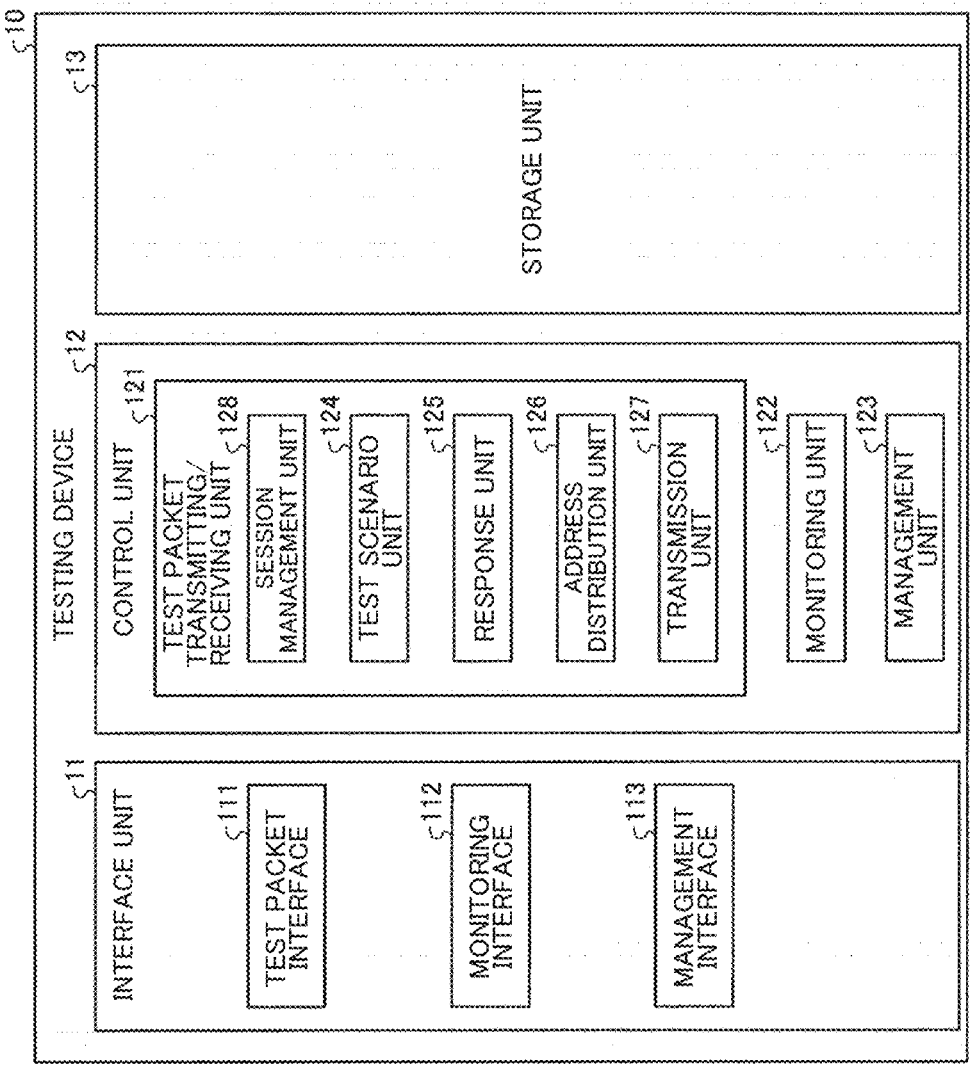
FIG. 2 illustrates an example configuration of the testing device according to the first embodiment.

Here, with FIG. 2, the testing device 10 will be described. FIG. 2 illustrates an example configuration of the testing device according to the first embodiment. As shown in FIG. 2, the testing device 10 includes an interface unit 11, a control unit 12, and a storage unit 13.

The interface unit 11 is an interface for communication control with other devices. For example, the interface unit 11 transmits and receives a packet to/from other devices through a network. In addition, the interface unit 11 is, for example, a network interface card such as a LAN card.

The interface unit 11 includes a test packet interface 111, a monitoring interface 112, and a management interface 113. The test packet interface 111 transmits and receives a packet when performing the test packet transmitting/receiving function. In addition, the monitoring interface 112 transmits and receives a packet when performing the monitoring unit 122 in the testing device 10. In addition, the management interface 113 transmits and receives a packet when performing the management unit 123 in the testing device 10.

The control unit 12 controls the entire testing device 10. For example, the control unit 12 is an electronic circuit such as the central processing unit (CPU), micro processing unit (MPU), and graphical processing unit (GPU) or an integrated circuit such as the application specific integrated circuit (ASIC) and field programmable gate array (FPGA). The control unit 12 includes a test packet transmitting/receiving unit 121, a monitoring unit 122, and a management unit 123. Note that the monitoring unit 122 is an example of a surveillance unit.

The test packet transmitting/receiving unit 121 includes a test scenario unit 124, a response unit 125, an address distribution unit 126, a transmission unit 127, and a session management unit 128.

The session management unit 128 acquires session information to configure a session with the server 23 as a to-be-tested device protected by a security device 22 performing authentication of a packet. For example, when an own testing device operates as a representative of a plurality of testing devices, the session management unit 128 acquires session information from the server 23 as the to-be-tested device and transmits the session information to other testing devices. Also, when the own testing device is not the exemplary, the session management unit 128 receives the session information from the representative testing device.

Specifically, the session management unit 128 performs in advance authentication processing such as login with the to-be-tested system 20 such as a Web server. The session management unit 128 acquires from a packet received from the server 23 a cookie including the session information. Then, when the own testing device 10 operates as the representative of the testing devices, the session management unit 128 transmits to the session management units 128 of the other testing devices the cookie acquired from the server 23. In addition, when the own testing device 10 is not the exemplary of the testing devices, the session management unit 128 receives a cookie from the representative testing device and applies it to a test packet to be transmitted.

In addition, for example, when the own testing device operates as the representative of the testing devices, the session management unit 128 acquires, according to the expiration date of the session information, the session information again from the server 23 as the to-be-tested device before the expiration date expires. The session management unit 128 then transmits the session information to the other testing devices. In other words, according to the expiration date of the session information, the session management unit 128 logs in the server 23 again and acquires a cookie from the server 23 before the expiration date expires. Thus, the session management unit 128 performs an attack test from the to-be-tested system 20 to a web page that may be displayed only after login, while minimizing the login processing to the server 23 within the expiration date of the session information.

The test scenario unit 124 generates a test packet using the session information acquired by the session management unit 128 and generates a test session according to a predetermined scenario when transmitting the test packet to the server 23 as the to-be-tested device. In addition, the test scenario unit 124 configures a session with the server 23 as the to-be-tested device and generates a test packet that performs login or search to the server 23 as the to-be-tested device according to the scenario.

For example, the test scenario unit 124 establishes HTTP and HTTPS sessions with the to-be-tested system 20 such as a Web server according to a scenario written in script, etc. and then generates a test packet for the to-be-tested system 20. The test scenario unit 124 also generates a test packet based on the cookie received from the server 23 or the representative testing device to transmit a test packet carrying session information such as log-in information.

The test scenario unit 124 also performs test packets other than GET and POST Flood, including attack tests of creating and deleting a plurality of accounts for the server 23, frequent log in and out from the accounts, and frequent searches. The test scenario unit 124 also performs, in addition to the above attack tests, an attack test, such as Slow READ, of changing the TCP header on the carried session.

The response unit 125 receives a response request corresponding to TCP authentication, HTTP authentication, and challenge response authentication performed by the security device 22. The response unit 125 then identifies the received response request, and makes a response that adapts to the identified response request, in other words, a response by which the security device 22 authenticates the attack packet to be valid.

An address distribution unit 126 distributes source IP addresses of the test packets to be transmitted according to a preset IP address list. By way of example, the address distribution unit 126 allocates, to the TCP SYN packet transmitted as the test packet, different source IP addresses according to the IP address list, and in the subsequent same TCP connection, uses the same source IP address, thus communicating using different source IP addresses in a plurality of TCP connections.

In addition, if the address distribution unit 126 is notified of a packet filtering threshold of the to-be-tested system from the monitoring unit 122, the address distribution unit 126 controls the number of source IP addresses and adjusts the test packet transmission per source IP address not to correspond to the packet filtering threshold of the to-be-tested system.

The transmission unit 127 transmits a test packet for increasing processing load to the server 23 protected by the security device 22, the security device 22 performing authentication of the packet transmitted to the to-be-protected device. In addition, for example, the transmission unit 127 may transmit to the server 23 as the to-be-tested device the test packet as well as a packet generated by an operation of a Web browser.

For example, when transmitting a test packet, the transmission unit 127 sets packet information such as a user agent to be the same as that of a general browser. This setting is to prevent the test packet from being determined as not from a general browser and discarded according to the packet information such as the user agent, if the security device 22 has a packet discard function with a packet signature. By way of example, a packet transmitting function of a general browser may be used.

The monitoring unit 122 monitors situations of packet filtering and processing load of the security device 22 or server 23 to which an attack packet authenticated valid by the security device 22 is transmitted.

As monitoring of the packet filtering situation, the monitoring unit 122 monitors the number of test packets, the byte amount, and the number of sessions per unit of time per source IP address, and the response packet from the to-be-tested system. Then the monitoring unit 122 knows the source IP address that comes to transmit no response packet even if it is receiving a test packet, although other source IP addresses are transmitting a response packet to the test packet. As the packet filtering threshold of the to-be-tested system, the monitoring unit 122 records the number of test packets, the byte amount, the number of sessions, and the time stamp that are transmitted to the relevant source IP address at the time immediately before the relevant source IP address comes to transmit no response packet. The monitoring unit 122 then notifies the control unit 12 of those values.

The storage unit 13 stores various types of information used in performing the control unit. For example, the storage unit 13 is a semiconductor memory device such as random access memory (RAM) and flash memory or a storage device such as a hard disk and an optical disk, etc.

The testing device 10 may perform a packet load test on the devices included in the to-be-tested system 20. Here, the packet load test by the testing device 10 will be described with reference to the packet load test on the security device 22 and server 23 by way of example.

In transmitting the packet to the server 23, the to-be-tested system 20 allows the security device 22 to pass the normal browser communication and block out an attack packet by a bot or an attack tool. For example, if the security device 22 senses transmission of a packet to the server 23, the device 22 makes an authentication request for the relevant packet. For example, the TCP authentication, HTTP authentication, and challenge response authentication are requested. The security device 22 also monitors the number of packets, the byte amount, the number of sessions per unit of time per source IP address, etc. If they exceed a predetermined threshold, the security device 22 registers the relevant source IP address in a blacklist. In the above rule, whether or not to register can be determined on the basis of that the source of the packet is a general browser operated by a person, the operator makes a response that adapts to the response request, and the number of packets and byte amount per unit of time transmitted by a general browser operated by a person does not correspond to a predetermined threshold.

In addition, simple packet transmission such as SYN Flood and GET Flood for testing the processing load on the server 23 only measures the processing load of a part of the server processing that addresses the denial-of-service attack.

Then, the conventional schemes have a problem that for a to-be-tested device that needs login authentication, when testing a Web page that may be accessed only after login, the login processing is necessary for each test session and the load of the to-be-tested Web page as well as the load of the login page are added. The conventional schemes also have a problem that monitoring of the login page may protect the entire Web site so that even if there is a problem with a Web page that may be accessed only after login, it is difficult to discover it.

Thus, with the conventional attack tool that is intended for the packet load test, it has been difficult to perform the packet load test that measures the processing load of a Web page that may be accessed only after login in the server 23 and the processing load at each stage of the security device 22.

Figure 3:
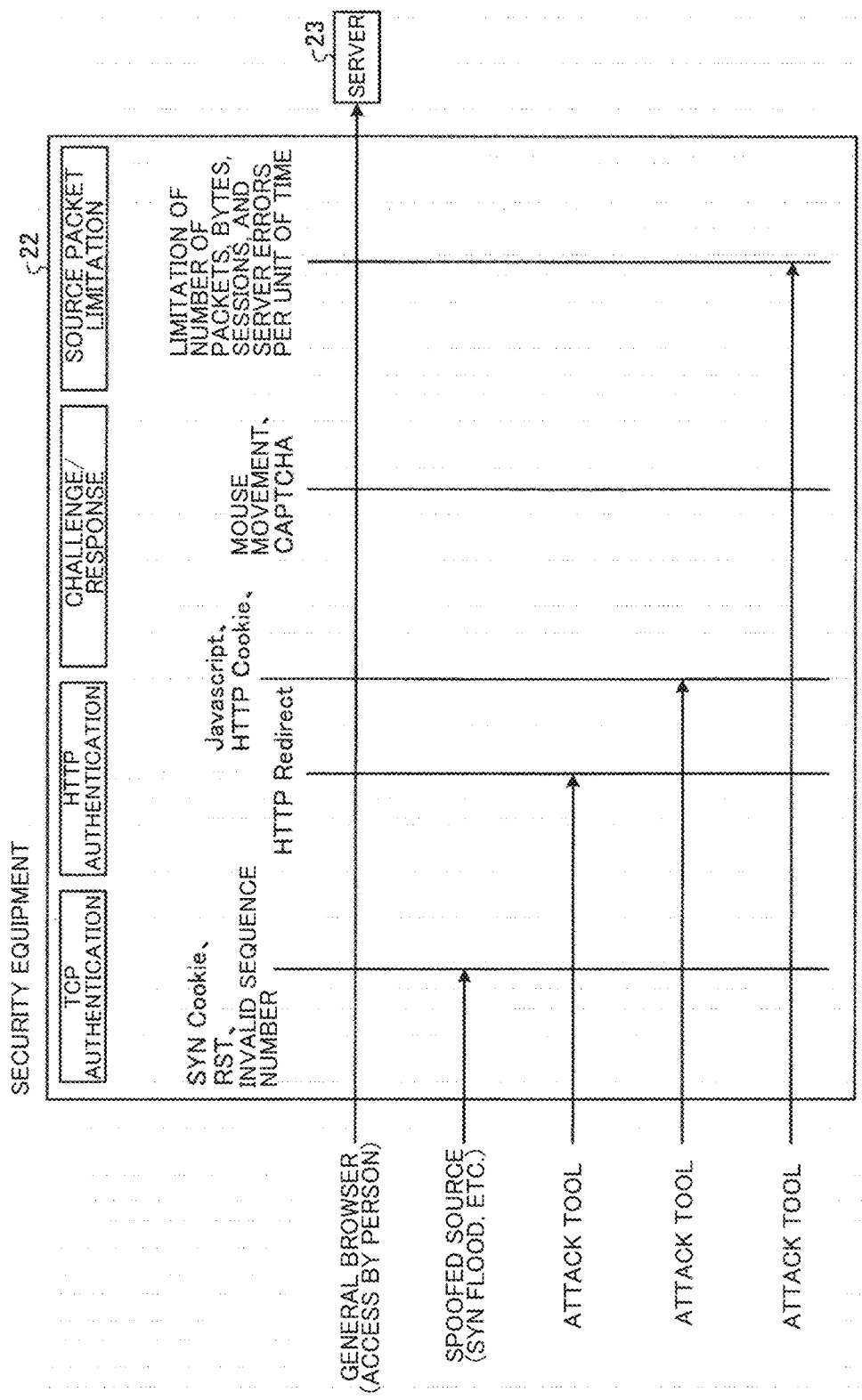
FIG. 3 illustrates a multi-stage protect function.

First, with reference to FIG. 3, a multi-stage protect function will be described. FIG. 3 illustrates the multi-stage protect function. As shown in FIG. 3, in transmitting the packet to the server 23, the security device 22 needs to perform limitation of the number of source packets and authentication at a plurality of stages. The security device 22 performs, for example, the TCP authentication, HTTP authentication, challenge response authentication, limitation of the number of source packets per unit of time, limitation of the number of source bytes per unit of time, and limitation of the number of sessions per unit of time.

For example, if the security device 22 senses the transmission of the packet to the server 23, the security device 22 monitors, for the relevant packet, the number of packets and the number of sessions, etc. per source IP address. Then, if the source of the packet clears the threshold based on the number of packets and the number of sessions, etc. transmitted by the general browser operated by a person, then the security device 22 may allow the packet to pass the function of limiting the number of source packets. For example, if the threshold to be passed is set as 6 packets/sec or below and 6 sessions/sec or below, the security device 22 determines that the source IP address meeting the threshold to be passed is communication from the general browser and passes it.

Meanwhile, if the transmitted packet is intended for an SYN Flood attack by a spoofed source, the security device 22 discards the relevant packet at the stage of TCP authentication. Therefore, even if the packet is transmitted by the attack tool intended for the packet load test on the server 23, the security device 22 senses, at a predetermined stage, that the transmission of the relevant packet is the attack and discards the relevant packet. Additionally, even if there is an attack tool that may respond to the TCP authentication, HTTP authentication, and challenge/response, the attack tool may be determined to be the attack according to the limitation of the number of packets, the limitation of the number of bytes, and the limitation of the number of sessions per unit of time by the source packet limitation. Thus, the relevant source IP address may be registered in a blacklist and the packet may be discarded. For the reasons described above, with the conventional attack tool that is intended for the packet load test, it has been difficult to perform the packet load test on the server 23 and security device 22.

In contrast, the testing device 10 according to the first embodiment may allow the server 23 and security device 22 to perform the packet load test properly. Here, with reference to FIG. 4, a description is given of operations when the testing device 10 performs the packet load test on the server 23 or security device 22. Note that FIG. 4 shows an example where a testing device that operates as the representative is described as a testing device 10A and a testing device that is not the representative is described as a testing device 10B.

Figure 4:
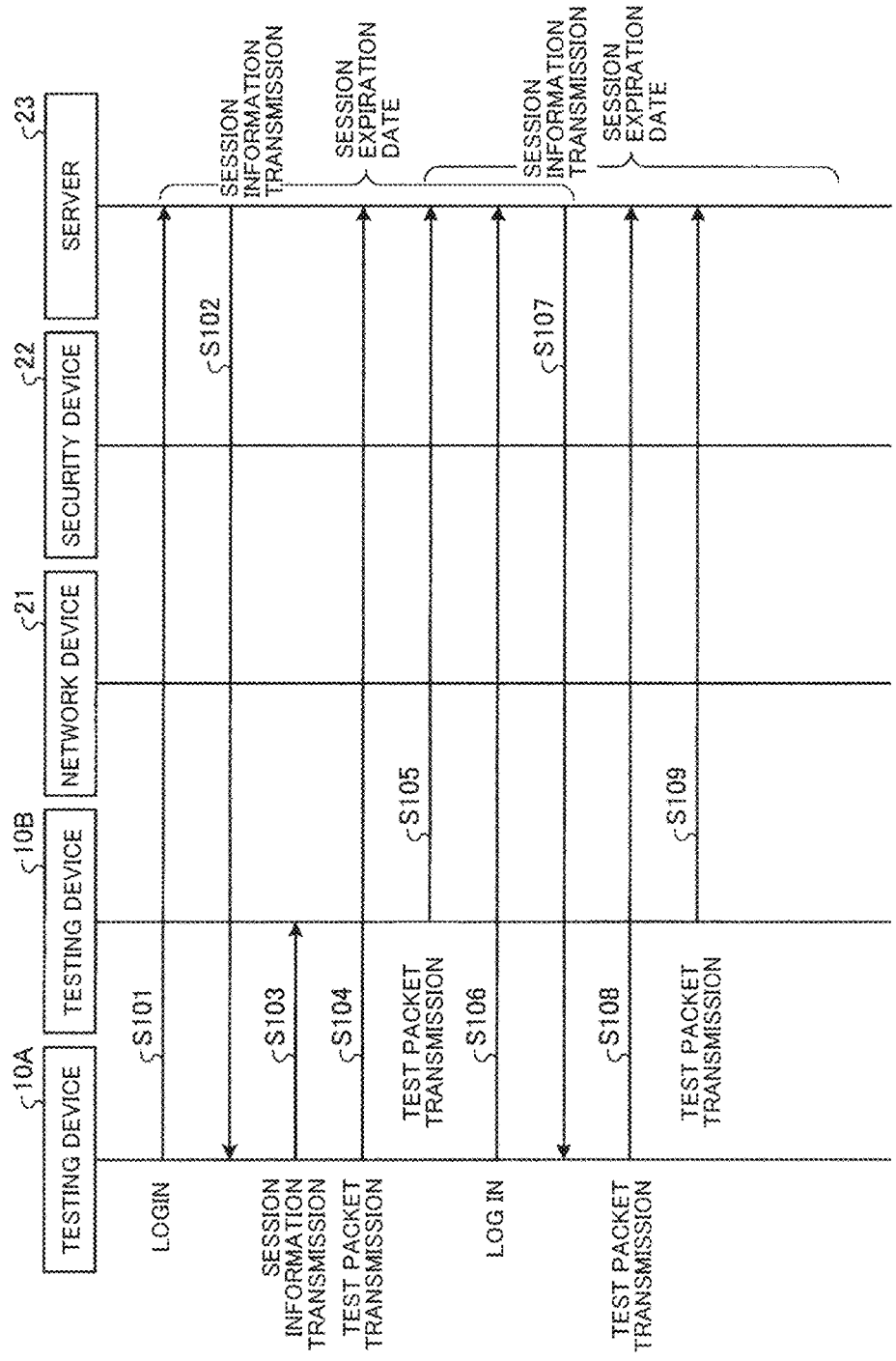
FIG. 4 is a sequence diagram for illustrating a packet load test by the testing device according to the first embodiment.

FIG. 4 is a sequence diagram for illustrating a packet load test by the testing device according to the first embodiment. First, the testing device 10 performs authentication processing such as login to the server 23 that is a to-be-tested device in advance (step S101). Next, after the authentication processing such as login is successful, the server 23 transmits session information to the testing device 10 (step S102).

Then, the testing device 10A acquires a Cookie including the session information from the packet received from the to-be-tested device. The testing device 10A then transmits to the session management unit of another testing device 10B the session information (Cookie) acquired from the server 23 (step S103). Then, the testing device 10B receives a Cookie from the representative testing device 10A and applies it to a test packet to be transmitted.

Next, the testing devices 10A and 10B set the attack packet and monitoring. In so doing, the testing devices 10A and 10B set to transmit test packets so that, for example, a large amount of test packets log into the server after the HTTP connection and perform a large amount of searches. In addition, the testing device 10 sets monitoring that performs, for example, response confirmation to ping and traceback of the server 23 or HTTP response confirmation.

In addition, as monitoring of the packet filtering situation, the testing devices 10A and 10B monitor the number of test packets, the byte amount, and the number of sessions per unit of time per source IP address, and the response packet from the to-be-tested system. Then, the testing devices 10A and 10B know the source IP address that comes to transmit no response packet even if it is receiving a test packet, although other source IP addresses are transmitting a response packet to the test packet. As the packet filtering threshold of the to-be-tested system, the testing devices 10A and 10B set to record the relevant source IP address that comes to transmit no response packet, the number of test packets, the byte amount, the number of sessions, and the time stamp that are transmitted to the relevant source IP address at the time immediately before the relevant source IP address comes to transmit no response packet. The testing devices 10A and 10B then notify the control unit of those values.

Then, the transmission units 127 of the testing devices 10A and 10B transmit the test packets from the test packet interface 111 (steps S104 and S105). In so doing, first, the transmission unit 127 transmits a TCP SYN packet to the IP address 10.0.0.1 of the server 23 to establish TCP connection with the server 23. Subsequently, on the basis of the expiration date of the session information, the testing device 10A performs again the authentication processing such as login to the to-be-tested device before the expiration date expires (step S106). Then, after the authentication processing such as login is successful, the server 23 transmits the session information to the testing device 10 (step S107). Then, as in the above processing, the transmission units 127 of the testing devices 10A and 10B transmit the test packet from the test packet interface 111 (steps S108 and S109).

When receiving the SYN packets from the testing devices 10A and 10B, the security device 22 performs TCP authentication response request to determine whether the SYN packet transmitted to the server 23 is the attack packet. Note that when the TCP connection is established, an SYN/ACK packet is transmitted to the source of the SYN packet.

Here, it is known that even if an invalid packet is transmitted to the SYN packet, for example, the attack tool does not make a response that adapts to the invalid packet and transmits the SYN packet again. Thus, for the TCP authentication, the security device 22 transmits to the testing device 10, invalid packets such as, for example, an SYN/ACK packet with a cookie, an SYN/ACK packet including invalid ACK sequence number, an ACK packet, and an RST packet. Then, if a response is returned that adapts to the transmitted invalid packet, the security device 22 allows the SYN packet to pass the TCP authentication.

Here, the response unit 125 makes a response to the security device 22 that adapts to the TCP authentication response request. For example, if an SYN/ACK packet including an SYN packet with a cookies is transmitted, the response unit 125 identifies that the relevant packet is an SYN/ACK packet with a cookie. Then, the response unit 125 transmits to the security device 22 an ACK packet with a sequence number that is set based on the contents of the relevant cookie. Note that it is considered that an attack tool intended for the SYN Flood attack makes no response even if the security device 22 transmits an SYN/ACK packet with a cookie.

The testing device 10 may thus establish the TCP connection with the server 23 and prevent the test packet transmitted by the transmission unit 127 from being discarded at the stage of TCP authentication. Then, the testing device 10 may perform the packet load test on the security device 22 and server 23 in the authentication at the stage before the TCP authentication.

If the TCP connection is established, the transmission unit 127 transmits an HTTP request packet to the server 23. The security device 22 makes an HTTP authentication response request to determine whether the HTTP request packet transmitted to the server 23 is the test packet.

Here, the response unit 125 makes a response to the security device 22 that adapts to the HTTPS authentication. For example, the response unit 125 identifies that the response from the security device 22 is a redirect response. Then, the response unit 126 transmits an HTTP request packet to a redirect destination that is specified to a value such as a uniform resource identifier (URI) indicated by a Location header in the redirect response. Note that it is considered that an attack tool that does not make a response adapting to the redirect response does not refer to the Location header or transmit the HTTP request packet to the redirect destination.

Additionally, in order to determine whether the HTTP request packet transmitted to the transmission server 23 is the attack packet, the security device 22 makes an HTTP authentication response request using an HTTP cookie or JavaScript (registered trademark).

In the HTTP authentication using the HTTP cookie or JavaScript, the security device 22 requests, for example, the testing device 10 to perform processing of reading the contents in the cookie and returning the read result using the program written in JavaScript. Then, if the performed result of the relevant program is returned in a predetermined time, the security device 22 allows the HTTP request packet to pass the HTTP authentication.

Here, the response unit 125 makes a response to the security device 22 that adapts to the HTTP authentication using an HTTP cookie or JavaScript. For example, the response unit 125 identifies that data transmitted from the security device 22 is a run command in JavaScript. Then, the response unit 125 notifies the security device 22 of the contents in the cookie obtained as a result of performing the program written in JavaScript. Note that it is considered that an attack tool that does not make a response adapting to the HTTP authentication using the JavaScript and cookie makes no response to the HTTP authentication using the HTTP cookie or JavaScript.

The testing device 10 may thus pass the HTTP authentication, thus preventing the attack packet transmitted by the transmission unit 127 from being discarded at the stage of HTTP authentication. Then, the testing device 10 may perform the packet load test on the security device 22 and server 23 in the authentication at a stage before the HTTP authentication.

Additionally, if the HTTP authentication is performed, the transmission unit 125 transmits a HTTP request packet to the server 23. In order to determine whether the HTTP request packet transmitted to the server 23 is the attack packet, the security device 22 makes a challenge response authentication response request.

When performing the challenge response authentication, the security device 22 requests, for example, the testing device 10*b* to perform a mouse movement on a predetermined path or the Completely Automated Public Turing test to tell Computers and Humans Apart (CAPTCHA). When a response is returned that adapts to the mouse movement or the CAPTCHA, the security device 22 allows the HTTP request packet to pass the authentication by the challenge response authentication.

Here, the response unit 125 makes a response to the security device 22 that adapts to the challenge response authentication. For example, the response unit 125 identifies that the security device 22 indicates a mouse movement path. Then, the response unit 125 reads the path indicated as the mouse movement path and transmits to the security device 22 the same signal as that generated when a mouse is moved along the read path.

The response unit 125 also identifies that the security device 22 indicates the CAPTCHA. Then, the response unit 126 transmits to the security device 22 text data converted from the CAPTCHA by an image-to-text service or OCR, etc. Note that it is considered that an attack tool that does not make a response adapting to the challenge response authentication makes no response to the challenge response authentication by the mouse movement or CAPTCHA.

The testing device 10 may thus pass the challenge response authentication, thus preventing the test packet transmitted by the transmission unit 127 from being discarded at the stage of challenge response authentication. Then, the testing device 10 may thus perform the packet load test on the server 23.

Increase of the source IP addresses of the test packets that may be transmitted from the single testing device 10 may allow for simulating the denial-of-service attack from a plurality of attackers. With this, it may allow for transmitting the test packets from a plurality of IP addresses without preparing multiple control units in the testing device. Thus, the test resources are reduced. If, for example, the test packet to be transmitted is the TCP SYN packet, the address distribution unit 126 allocates source IP addresses different from those of the previous TCP SYN packets sequentially according to the IP address list set by the management unit 123 and allocates the same source IP addresses to the relevant TCP connections. This may thus allow for transmitting the test packets from a plurality of source IP addresses while maintaining the IP address consistency of the TCP connection.

Then, on the test packet transmitted from the testing device 10 and the response packet from the to-be-tested system 20 to the test packet, the monitoring unit 122 monitors and analyzes the situation of the packet filtering of the to-be-tested system 20 for the test packet. As monitoring of the packet filtering situation, the monitoring unit 122 monitors the number of test packets, the byte amount, and the number of sessions per unit of time per source IP address, and the response packet from the to-be-tested system. Then the monitoring unit 122 knows the source IP address that comes to transmit no response packet even if it is receiving a test packet, although other source IP addresses are transmitting a response packet to the test packet. As the packet filtering threshold of the to-be-tested system 20, the monitoring unit 122 sets to record the relevant source IP address that comes to transmit no response packet, the number of test packets, the byte amount, the number of sessions, and the time stamp that are transmitted to the relevant source IP address at the time immediately before the relevant source IP address comes to transmit no response packet. The monitoring unit 122 then notifies the control unit 12 of those values.

If the address distribution unit 126 in the control unit 12 is notified of the packet filtering threshold of the to-be-tested system 20 from the monitoring unit 122, the address distribution unit 126 controls the number of source IP addresses and adjusts the test packet transmission per source IP address not to correspond to the packet filtering threshold of the to-be-tested system. For example, the address distribution unit 126 stops, for a certain amount of time, transmission from the source IP address that comes to receive no response packet and is determined to be packet filtered. The address distribution unit 126 then transmits a test packet from a new source IP address that has not been packet filtered yet. The address distribution unit 126 also performs packet transmission per source IP address in a limited range that does not correspond to the packet filtering.

The testing device 10 may thus pass the source packet limitation as shown in FIG. 3, thus preventing the test packet transmitted by the transmission unit 127 from being discarded at the stage of source packet limitation. The testing device 10 may thus perform the packet load test on the subject server 23.

Simple packet transmission such as SYN Flood and GET Flood as the packet load test on the server 23 may only measure the processing load of a part of the server processing that addresses the denial-of-service attack. Then, the test scenario unit 124 establishes the HTTP and HTTPS sessions with the to-be-tested system 20 such as a Web server according to a scenario written in script, etc. The test scenario unit 124 then generates a test packet based on the cookie received from the server 23 to transmit the test packet carrying session information such as log-in information to the server 23. The test scenario unit 124 performs test packets other than GET and POST Flood, including attack tests of creating and deleting a plurality of accounts for the server 23, frequent log in and out from the accounts, and frequent searches, and also an attack test, such as Slow READ, of changing the TCP header on the carried session.

This may allow for measuring, on the server 23, simple server processing load such as HTTP GET packet processing load and HTTP POST packet processing load as well as performing load test for processing load such as server 23 log-in information encryption and decryption processing load, search processing load, and database processing load.

Meanwhile, the monitoring unit 122 makes a monitoring response request to the server 23. For example, the monitoring unit 122 makes response confirmation to ping or traceback of the server 23 or HTTP response confirmation according to the setting by the testing device 10.

Then, the server 23 responds to the monitoring response request while processing the attack packet. Then, the monitoring unit 122 transmits the monitoring results to the testing device 10 from the monitoring interface 112.

Additionally, the testing device 10 analyzes the monitoring results and instructs the testing device 10 to change the scenario as necessary. Specifically, the testing device 10 analyzes the response time and response contents of the server 23 while taking correlation between the received monitoring results and test traffic, which is a type or amount of the attack packet. The testing device 10 records and analyzes, in a time series, the response time change and response message of the server 23, the test traffic contents when no response is received, and the test traffic contents when the response is restored, etc. and understands the function of high processing load.

As the scenario change, for example, the management unit 123 changes the amount of test packets transmitted by the transmission unit 127 depending on the situation of the processing load of the security device 22 or server 23. Specifically, if the processing load of the security device 22 or server 23 is at a predetermined level or more, the management unit 123 increases the amount of test packets transmitted to the security device 22 or server 23 by the transmission unit 127.

Then, the management unit 123 understands the function of high processing load and changes the scenario of the test traffic. The management unit 123 then extracts the test traffic condition at which the function of high processing load has the maximum load, according to the response time change and response message of the server 23 when the scenario is changed, the test traffic contents when no response is received, and the test traffic contents when the response is restored. Note that the testing device 10 may test and analyze a plurality of to-be-tested instruments including other than the server 23 and understand the instrument of high processing load among the to-be-tested instruments.

For example, as the testing device 10 increases the amount of log-in attack packets, the processing load of the server 23 increases and the HTTP response time increases. Then, the testing device 10 records the amount of attack packets when the server 23 makes the HTTP 404 error response in which the server is connected but cannot display the web page and the amount of attack packets when the server 23 cannot respond. The testing device 10 may thus understand the resistance of the server 23 against the log-in attack.

In addition, as the test packet increases in its amount, the security device 22 may detect the attack and discard the relevant attack packet, thus stopping the increase of the processing load of the server 23. In so doing, the testing device 10 understands, from the monitoring results, that increasing the attack packets to the server 23 does not increase the processing load of the server 23. In this case, the testing device 10 may test if the processing load increases by transmitting, by processing of the address distribution unit 126, the test packets from different source IP addresses in a range that does not correspond to the packet filtering threshold.

Then, the denial-of-service attack packet, etc. may be transmitted to the server 23 from not only the single testing device 10 but a plurality of testing devices according to the scenario. In so doing, when the relevant testing device operates as the representative of a plurality of testing devices, the testing devices are instructed to perform or stop the test scenario in synchronism. For example, when the own testing device operates as the representative of a plurality of testing devices, the session management unit 128 may instruct the other testing devices to perform or stop the scenario in synchronism. Thus, a countermeasure for a large amount of attacks per source IP address and the countermeasure effectiveness of cache, etc. may be studied and further monitored to understand the denial-of-service limitation, bottleneck, and test traffic pattern at that time, etc.

This may determine whether the responses of the server 23 monitored by a plurality of testing devices are different due to the filter setting to the testing device by the network device 21, security device 22, or server 23 itself, or the load of the server 23.

Note that the testing device 10 may quit the authentication on the way and perform the load test on the processing of the security device 22 at any authentication stage. For example, the testing device 10 may make a response that adapts to the TCP authentication response request by the security device 22, and then does not make a response that adapts to the HTTP authentication response request by the security device 22. The testing device 10 may thus perform the load test on the processing of the security device 22 at the HTTP authentication stage. Likewise, the testing device 10 may perform the load test on the security device 22 at each authentication stage to identify the authentication stage that is the bottleneck.

Effects of First Embodiment

The testing device 10 according to the first embodiment acquires session information to configure a session with the server 23 as the to-be-tested device protected by the security device 22 performing authentication of a packet. Then, the testing device 10 generates a test packet with the session information acquired and generates a test session according to a predetermined scenario when transmitting the test packet to the server 23 and transmits to the server 23 a test packet that increases processing load. Therefore, the testing device 10 may appropriately test a to-be-tested device that needs login authentication. In other words, the testing device 10 according to the first embodiment may perform an attack test from the to-be-tested system to a web page that may be displayed only after login, while minimizing the login processing to the server within the expiration date of the session information.

In addition, when the own testing device operates as the representative of a plurality of testing devices, the session management unit 128 of the testing device 10 according to the first embodiment acquires the session information from the server 23 and transmits the session information to the other testing devices. When the own testing device is not the representative, the session management unit 128 receives the session information from the representative testing device. Therefore, the testing devices 10 may appropriately test a to-be-tested device that needs login authentication.

In addition, when the own testing device operates as the representative of the testing devices, the session management unit 128 of the testing device 10 according to the first embodiment acquires, according to the expiration date of the session information, the session information again from the server 23 as the to-be-tested device before the expiration date expires. The session management unit 128 then transmits the session information to the other testing devices. Therefore, the testing device 10 may perform a load test from a plurality of testing devices on a web page that may be displayed only after login only by logging in once from one testing device 1 on a regular basis according to the expiration date of the session.

In addition, the testing device 10 according to the first embodiment may pass authentication by making a response that adapts to the response request corresponding to the authentication, avoid the packet filtering per source IP address, and then test the security resistance by applying load to decryption processing of the to-be-tested instrument and a plurality of points including database and the like. In addition, testing a plurality of stages of authentication and a plurality of instruments may identify the bottleneck.

In addition, every time the response unit 125 receives a response request corresponding to up to any stage of authentication among the stages of authentication performed stepwise by the security device 22, the response unit 125 identifies the received response request and makes a response that adapts to the identified response request, in other words, a response by which the security system authenticates the test packet to be valid. Thus, the testing device 10 according to the first embodiment may perform testing at any stage of the security device 22.

In addition, the transmission unit 127 transmits to the server 23 that is a Web server a test packet as well as a packet generated by the operation of the web browser. Thus, the testing device 10 according to the first embodiment may perform testing in a situation close to the actual attack.

In addition, the management unit 123 changes the amount of attack packets transmitted by the transmission unit 127 depending on the situation of the processing load of the security device 22 or server 23. Thus, the testing device 10 according to the first embodiment may know the operation corresponding to the processing load of the to-be-tested instrument.

In addition, if the processing load of the security device 22 or server 23 is at a predetermined level or more, the management unit 123 changes the contents of the test packet transmitted to the security device 22 or server 23 by the transmission unit 127. Thus, the testing device 10 according to the first embodiment may know the limit of the processing load of the to-be-tested equipment.

Other Embodiments

If the server 23 is a server other than the Web server, such as a DNS server, or if the network device 21 or security device 22 is studied, the testing device transmits the normal packet and a denial-of-service attack packet according to the protocol and application being served by the to-be-tested instrument. In so doing, the security device 22 may transmit a request of DNS authentication, etc. such as a TCP retransmission request, but the testing device transmits a packet according to the request. Thus, even if additional authentication is performed, the security resistance and bottleneck may be studied on the to-be-tested instrument.

[System Configuration, etc.]

In addition, the elements of the devices shown are ideational functions and may not be necessarily configured as physically shown. In other words, specific aspects of the distribution and integration of the devices are not limited to those as shown, and all or some of the devices may be configured by functionally or physically distributing or integrating them in any unit depending on various loads and utilization or the like. Additionally, for the processing functions performed by the devices, all or any part of the functions may be achieved by a CPU and a program analyzed and performed by the CPU or achieved as hardware with a wired logic.

In addition, among the processing described in this embodiment, all or part of the processing described as being done automatically may be done manually or all or part of the processing described as being done manually may be done automatically in a well-known manner. In addition, information including the processing procedure, control procedure, specific names, and various types of data and parameters described in the above description and drawings may be arbitrarily changed unless otherwise described.

[Program]

In addition, a program written in a language executable by a computer may be created for processing performed by the testing device described in the above embodiment. For example, a program written in a language executable by a computer may be created for processing performed by the testing device according to the embodiment. In this case, the same effects as in the above embodiment may be provided by a computer executing the program. An example computer that performs a program will be described below.

Figure 5:
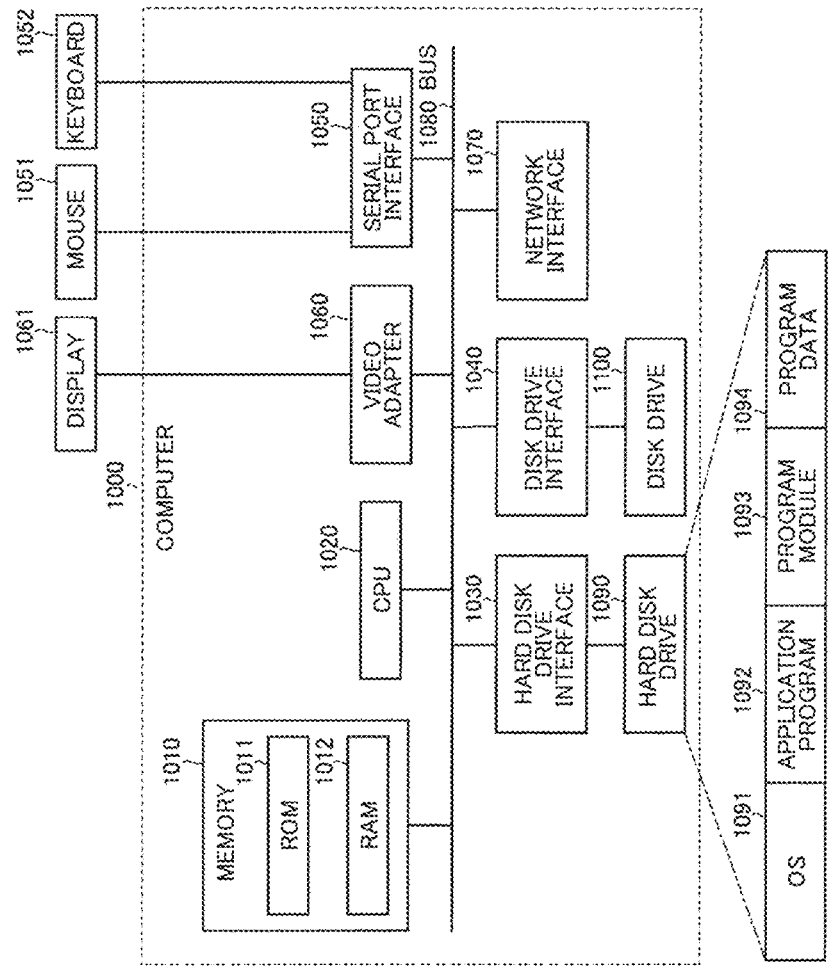
FIG. 5 illustrates a computer that performs a program.

FIG. 5 illustrates a computer that performs a program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are connected via a bus 1080.

The memory 1010 includes a read only memory (ROM) 1011 and a RAM 1012. The ROM 1011 stores, for example, a boot program such as basic input output system (BIOS). The hard disk drive interface 1030 is connected to a hard disk drive 1090. The disk drive interface 1040 is connected to a disk drive 1100. For example, a removable storage medium such as a magnetic disk and an optical disk is inserted in the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. In other words, a program defining the processing of the devices is implemented as the program module 1093 in which a computer executable code is described. The program module 1093 is stored in, for example, the hard disk drive 1090. For example, the program module 1093 for performing the same processing as in the function configuration in the devices is stored in the hard disk drive 1090. Note that the hard disk drive 1090 may be replaced with a solid state drive (SSD).

In addition, data used in the processing of the above embodiment is stored as the program data 1094 in, for example, the memory 1010 and hard disk drive 1090. Then, the CPU 1020 reads out the program module 1093 and program data 1094 stored in the memory 1010 and hard disk drive 1090 to the RAM 1012 as necessary and performs them.

Note that the program module 1093 and program data 1094 are not limited to being stored in the hard disk drive 1090, and may also be stored in, for example, a removable storage medium and read out by the CPU 1020 via the disk drive 1100, etc. Alternatively, the program module 1093 and program data 1094 may be stored in other computers connected via a network and WAN. Then, the program module 1093 and program data 1094 may be read out by the CPU 1020 from other computers via the network interface 1070.

REFERENCE SIGNS LIST

1 Network
10 Testing device
11 Interface unit
12 Control unit
13 Storage unit
20 To-be-tested system
21 Network device
22 Security device
23 Server
111 Test packet interface
112 Monitoring interface
113 Management interface
121 Test packet transmitting/receiving unit
122 Monitoring unit
123 Management unit
124 Test scenario unit
125 Response unit
126 Address distribution unit
127 Transmission unit
128 Session management unit

The invention claimed is:

1. A testing device comprising:
processing circuitry configured to
acquire session information to configure a session with a to-be-tested device protected by a security device that performs authentication of a packet;
generate a test packet with the session information acquired and generate a test session according to a predetermined scenario when transmitting the test packet to the to-be-tested device; and
transmit to the to-be-tested device a test packet that increases processing load,
wherein when the testing device operates as a representative of a plurality of testing devices, the processing circuitry acquires the session information from the to-be-tested device and transmits the session information to other testing devices and when the testing device is not the representative, the processing circuitry receives the session information from another testing device serving as the representative testing device.

2. The testing device according to claim 1, wherein when the testing device operates as the representative of the testing devices, the processing circuitry acquires, according to an expiration date of the session information, the session information again from the to-be-tested device before the expiration date expires and transmits the session information to the other testing devices.

3. The testing device according to claim 1, wherein the processing circuitry configures a session with the to-be-tested device and generates a test packet that performs login or search to the to-be-tested device according to the scenario.

4. The testing device according to claim 1, wherein when the testing device operates as the representative of the testing devices, the processing circuitry instructs the other testing devices to perform or stop the scenario in synchronism.

5. The testing device according to claim 1, wherein the processing circuitry is further configured to change an amount of the test packet transmitted depending on a situation of the processing load of the security device or the to-be-tested device.

6. A testing method performed by a testing device, comprising:
acquiring session information to configure a session with a to-be-tested device protected by a security device that performs authentication of a packet;
generating a test packet with the session information acquired and generating a test session according to a predetermined scenario when transmitting the test packet to the to-be-tested device; and
transmitting to the to-be-tested device a test packet that increases processing load,
wherein when the testing device operates as a representative of a plurality of testing devices, the session information from the to-be-tested device is acquired and the session information is transmitted to other testing devices and when the testing device is not the representative, the session information is received by the testing device from another testing device serving as the representative testing device.

7. A non-transitory computer-readable medium storing computer-readable instructions that, when executed by a processor of a testing device, cause the processor to perform a method comprising:
acquiring session information to configure a session with a to-be-tested device protected by a security device that performs authentication of a packet;
generating a test packet with the session information acquired and generating a test session according to a predetermined scenario when transmitting the test packet to the to-be-tested device; and
transmitting to the to-be-tested device a test packet that increases processing load,
wherein when the testing device operates as a representative of a plurality of testing devices, the session information from the to-be-tested device is acquired and the session information is transmitted to other testing devices and when the testing device is not the representative, the session information is received by the testing device from another testing device serving as the representative testing device.

8. The testing device according to claim 1, wherein the session information includes a cookie provided by the security device.

9. The testing device according to claim 8, wherein to obtain the cookie from the security device, the processing circuitry performs authentication processing with the to-be-tested device.

10. The testing device according to claim 9, wherein the to-be-tested device is a web server, and the test packet is one of an HTTP packet and an HTTPS packet.

11. The testing device according to claim 10, wherein the predetermined scenario includes at least one of a GET and POST Flood, creating and deleting accounts, logins, and searches.

12. The testing device according to claim 11, wherein the processing circuitry transmits a plurality of test packets according to a list of source IP addresses.

13. The testing device according to claim 12, wherein the processing circuitry controls transmission of the plurality of test packets to avoid a packet filtering threshold.

14. The testing device according to claim 1, wherein the processing circuitry sets the test packet to include information from a general web browser.

15. The testing method according to claim 6, wherein when the testing device operates as the representative of the testing devices, the session information is acquired again from the to-be-tested device, according to an expiration date of the session information, before the expiration date expires, and the session information is transmitted to the other testing devices.

16. The testing method according to claim 6, wherein a session with the to-be-tested device is configured and a test packet that performs login or search to the to-be-tested device is generated according to the scenario.

17. The testing method according to claim 6, wherein when the testing device operates as the representative of the testing devices, the other testing devices are instructed to perform or stop the scenario in synchronism.

18. The non-transitory computer-readable medium according to claim 7, wherein when the testing device operates as the representative of the testing devices, the session information is acquired again from the to-be-tested device, according to an expiration date of the session information, before the expiration date expires, and the session information is transmitted to the other testing devices.

19. The non-transitory computer-readable medium according to claim 7, wherein a session with the to-be-tested device is configured and a test packet that performs login or search to the to-be-tested device is generated according to the scenario.

\* \* \* \* \*